United States Patent [19]

Seppälä et al.

[11] Patent Number: 5,380,813

[45] Date of Patent: Jan. 10, 1995

[54] METHOD FOR PRODUCING LACTIC ACID BASED POLYURETHANE

[75] Inventors: Jukka Seppälä; Johan-Fredrik Selin, both of Helsinki, Finland; Tao Su, Nanning, China

[73] Assignee: Neste OY, Porvoo, Finland

[21] Appl. No.: 138,539

[22] Filed: Oct. 15, 1993

[30] Foreign Application Priority Data

Oct. 16, 1992 [FI] Finland .................................. 924699

[51] Int. Cl.⁶ ............................................ C08G 18/06
[52] U.S. Cl. .......................................... 528/58; 528/80
[58] Field of Search ..................................... 528/58, 80

[56] References Cited

U.S. PATENT DOCUMENTS 4,804,691  2/1989  English et al. .

FOREIGN PATENT DOCUMENTS 55-54322  4/1980  Japan .
63-278924  11/1988  Japan .
1-297420  11/1989  Japan .
1016314A  5/1983  U.S.S.R. .

OTHER PUBLICATIONS

Chemical Abstracts, vol. 108 (1988), 187470s, JP 62-280220.

*Primary Examiner*—Maurice J. Welsh
*Attorney, Agent, or Firm*—Pennie & Edmonds

[57] ABSTRACT

The present invention relates to a production method of lactic acid-based polyurethanes. In the first phase of the product ion, the monomeric lactic acid is polymerized into an oligomer, the molecular weight thereof being about 500 to 10,000. Next, the oligomer thus obtained is copolymerized with an isocyanate reacting with the free hydroxyl and carboxyl groups thereof into polyurethane with a high molecular weight. To make the oligomer react with diol prior to the copolymerization is unnecessary according to the invention. The lactic acid used need not be absolutely pure, and by modifying the process, various biodegradable end products can be obtained therefrom, which according to the invention are appropriate for the material of disposable packages, agricultural film or planting pots, or as a coating of fertilizer granules.

14 Claims, No Drawings

METHOD FOR PRODUCING LACTIC ACID BASED POLYURETHANE

BACKGROUND OF THE INVENTION

The present invention relates to a method for producing lactic acid based polyurethane. In addition, the invention relates to certain applications of the polyurethane thus produced.

Lactic acid polymers have been produced by polymerizing lactide, which is a cyclic dimer of the lactic acid. The polylactic acid thus obtained has a high molecular weight and good physical properties. However, drawbacks have been technical difficulties in manufacturing lactide and as a result thereof, the poor total yield of the process. It is also possible to polymerize monomeric acid, but the molecular weight of the product called lactic acid—oligomer thus obtained is so low, generally below 10,000, that the product is not appropriate as a plastic in such. The molecular weight of the oligomer has been increased by making it to react with diol and by copolymerizing it thereafter with isocyanate into polyurethane. Polyurethane based on lactic acid has also been prepared using an equivalent method, starting from lactide, i.e. dimeric acid.

The lactic acid polymers are characterized in that they are biodegradable. For this reason, they have been used for medical applications, such as surgical applications, requiring high quality and purity of the product.

Production methods of lactic acid-based polyurethanes have been described in some prior patent specifications. In the U.S. Pat. No. 4,804,691 a method is disclosed, in which lactide is used as the starting material. The product thus obtained is intended for joining of soft live tissues. In U.S. Pat. No. 1,016,314 and JP application publication No. 63,278,924, production methods of self-degradable polyurethanes appropriate for medical purposes, such as surgical purposes are described, in which a polymer obtained from lactic acid and diol, such as ethylene glycol, is copolymerized further with isocyanate. In JP application specification No. 01,297,420 an equivalent method is disclosed, a product obtained which is described to be resistive and appropriate for a coating material. In JP application publication No. 55,054,322 a polyurethane based on lactic acid and a plurality of other starting materials is furthermore known, said polyurethane being, according to said publication, among other things, resistive to solvents.

SUMMARY OF THE INVENTION

The objective of the present invention is to produce a simpler production method than before for lactic acid—based polyurethane, a product obtained being less costs involving than before, and enabling a wide variation of the properties of the product. The invention is characterized in that the monomeric lactic acid is first polymerized into an oligomer with a lower molecular weight and that thereafter, the oligomer is copolymerized with an isocyanate reacting with the free hydroxyl and carboxyl groups thereof to form a polyurethane with a higher molecular weight.

As taught by the invention, it has been found that the lactic acid—oligomer can be copolymerized directly with a high, about 100% yield, into polyurethane without having to make it react first, in order to increase the amount of the hydroxyl groups reacting with diol. The result of the copolymerization is at simplest a chain produced by alternating oligomer units and di-isocyanate molecules, in which the isocyanate groups are joined to a hydroxyl group or carboxyl group at the end of a chain-resembling oligomer. In practice, the reactions are, however, more complex, depending e.g. on the degree of purity of the starting materials, and they may lead also to crosslinked molecular structures.

The monomeric lactic acid used as the starting material of the method of the invention can be prepared by fermentation of glucose. The lactic acid need not be pure, instead, it may contain, for instance, reactive sugar remains bound as part of the polymer thus obtained. The process according to the invention can be implemented on large scale so that an inexpensive end product is obtained which is characterized by high biodegradability in nature. The product is therefore appropriate for packaging material, ending after use to the land fill decomposing by time. In addition, the product is particularly appropriate for agricultural purposes, degrading after use.

The starting material of the invention can be L, DL, or D lactic acid, or a mixture thereof. In the first phase of the method, the lactic acid is polymerized into an oligomer with molecular weight of 500 to 10,000.

In the next copolymerization phase, about 5 to 70 per cent by weight, preferably 10 to 50 per cent by weight of isocyanate and about 30 to 95 per cent by weight, preferably 50 to 90 per cent by weight of lactic acid oligomer can be combined, the substances reacting into an end product, the molecular weight of which can be several hundreds of thousands. The copolymerization is accomplished at 50° to 200° C., preferably at 80° to 160° C. so that the temperature is raised towards the end of the reaction. The polymerization can be accomplished without a catalyst, or by using tin octoate, dibutyl tin laurate, dibutyl tin diacetate, or a tertiary amine, such as 1,4-diazo(2,2,2) bicyclo octane, for the catalyst. The quantity of the catalyst is at most 2% of the total weight of the reaction mixture.

The isocyanate participating in copolymerization is according to the invention preferably hexamethyl di-isocyanate, diphenyl methane di-isocyanate, toluene di-isocyanate, or a mixture thereof. In addition to said di-isocyanates, also tri-isocyanate can be used with which crosslinking of the polyurethane thus obtained is produced. On the other hand, the crosslinking may also result from impurities present therein.

In addition to the method thus described, the invention concerns the use of the polyurethane thus obtained for the material of disposable packages, agricultural film or planting pots, or as a coating for fertilizer granules. Such packages are e.g. bottles or boxes which after use end up in land fills decomposing there by the action of bacteria and moisture. The agricultural films are, e.g. film sheets used in vegetable and berry cultivations, their purpose being to retain moisture and to prevent the soil from drying. Produced from a lactic acid-based polyurethane, they, as well as the planting pots for saplings decompose after use. As a coating of fertilatizer granules, the polyurethane, degrading with time, regulates the release of the fertilizing nitrogen and in such way prevents or restrains it from flushing from the fields polluting water ways.

DETAILED DESCRIPTION OF THE INVENTION

The invention is demonstrated with the following embodiment examples. In examples 1 to 4, the lactic acid—oligomer was prepared by polymerizing commercially available, substantially pure lactic acid as such. Examples 5 and 6 show that not even a greater quantity of sugar or organic acid included in the lactic acid causes any harm to polymerization.

EXAMPLE 1

800 g of 90% aqueous solution of DL lactic acid were poured into a 1,000 ml three-necked flask provided with a condenser and heated to 200° C. in nitrogen atmosphere for 20 hrs. Hereby, the lactic acid became polymerized into lactic acid oligomer, the average molecular weight being 1580.

20 g of the lactic acid thus obtained, 10.3 g hexamethyl di-isocyanate and 0.05 g stannous octoate were reacted by mixing in a reaction vessel, maintained first at 100° C. for six hours, then at 150° C. for four hours. This resulted in a plastic-resembling product partly soluble in $CH_2Cl_2$ and $CHCl_3$. A film produced by casting from a solution of said product was viscous and flexible. Compared with the following examples, the reaction time in the present example was shorter and the reaction temperature lower, and the product thus obtained was lighter in colour.

EXAMPLE 2

800 g of 90% aqueous solution of L lactic acid were poured into a 1000 ml three-necked flask provided with a condenser and heated in nitrogen atmosphere to 200° C. for 20 hrs. The average molecular weight of the lactic acid—oligomer thus obtained was 1700. 10 g of the oligomer thus obtained and 10 g hexamethyl di-isocyanate were polymerized in 100 ml reaction vessel without a catalyst. The reagents were diluted with 50 ml toluene. The reaction mixture was kept at 80° C. for two hours, whereafter the toluene was distilled off from the liquid solution at 115° to 160° C. When the mixture thereafter was cooled to room temperature, it became a wax-like solid matter. Thereafter, 10 g of the lactic-acid oligomer were added and heated to 127° C. for 66 hrs. The end product thus obtained was at room temperature a yellow rubber-like elastomer.

EXAMPLE 3

In 85.8 g of DL lactic acid oligomer, being an intermediate product according to example 1, 25.8 g toluene di-isocyanate were added in four batches so that the addition of the last batch was accomplished eight hours before the copolymerization reaction ended. The reaction mixture in the vessel was mixed in the course of the reaction, but no catalyst was used. Into the reaction mixture, 60 ml toluene was added in order to obtain uniform mixing. The toluene was subsequently evaporated off at 140° to 190° C. during 13 hrs. Thereafter, the reaction was continued for 28 hrs at 140° C.

The product thus obtained was kept for a few months at room temperature, whereafter it was heated in an oven to 72° C., whereby it became expanded into a rigid, brittle foam with a density of about 0.16 g/cm³.

EXAMPLE 4

40 g of the DL lactic acid oligomer obtained as an intermediate product in Example 1 and 20 g of hexamethyl di-isocyanate were copolymerized without a catalyst by keeping them for 10 hrs at 140° C., thereafter for 11 hrs at 160° C., and finally, for 48 hrs at 180° C.

The product thus obtained was yellow in colour, strong and could be converted into a hard foam according to Example 3.

EXAMPLE 5

195 g of 90% aqueous solution of DL lactic acid and 5.0 g glucose were poured into a reaction vessel provided with a condenser. In the vessel, 12 mm Hg vacuum was generated with a water jet pump, and the temperature was raised slowly from room temperature to 130° C. The total reaction time was 11 hrs. The product thus obtained was a viscous liquid which was not fluid at room temperature. No separate solid glucose phase could be discerned. 21 g of said product of the first phase of the process, 12.6 g hexamethyl di-isocyanate, 0.08 g stannous octoate and 0.11 g of 1,4-diazo-(2,2,2)bicyclo octane were thereafter poured into a reaction vessel and heated with mixing to 110° C. for four hours. The product thus obtained was white, resilient, foamy substance with a density of about 0.16 g/cm³.

EXAMPLE 6

600 g of 90% aqueous solution of L lactic acid and 59 g succinic acid were poured into a round reaction vessel provided with a condenser. Nitrogen atmosphere was arranged into the vessel and its temperature was raised slowly from room temperature to 180° C. The total reaction time was 20 hrs. The product thus obtained was a viscous liquid which was not fluid at room temperature. 28 g of said intermediate product of the process, 14 g hexamethyl di-isocyanate, 0–11 g stannous octoate, and 0.13 g of 1,4,-diazo (2,2,2)-bicyclo octane were inserted in a reaction vessel and heated to 110° C. for four hours. The end product was white, rigid and foamy.

It is obvious to a person skilled in the art that the invention is not restricted to the above embodiment examples, and it may vary within the scope of the accompanying claims.

We claim:

1. A method for producing lactic acid based polyurethane, comprising the steps of polymerizing monomeric lactic acid into an oligomer with a first molecular weight, and thereafter copolymerizing the oligomer with diisocyanate reacting with the free hydroxyl and carboxyl groups of it to form a polyurethane with a second molecular weight higher than said first molecular weight.

2. Method according to claim 1, wherein the molecular weight of the oligomer obtained as an intermediate product is about 500 to 10,000.

3. Method according to claim 1, wherein about 5 to 70 percent by weight of isocyanate and about 30 to 95 percent by weight of lactic acid oligomer are copolymerized to become polyurethane.

4. Method according to claim 1, wherein the isocyanate is hexamethyl diisocyanate, diphenyl methane diisocyanate, or toluene diisocyanate.

5. Method according to claim 1, wherein the copolymerization is accomplished at 50° to 200° C., preferably 80° to 160° C.

6. Method according to claim 1, wherein the copolymerization is accomplished without a catalyst.

7. Method according to claim 1, wherein stannous octoate is used as a catalyst in the copolymerization.

8. Method according to claim 1, wherein said monomeric lactic acid is provided in the form of a composition that includes sugar or an organic acid.

9. A material for disposable packages, said material being comprised of a lactic acid based polyurethane in which a monomeric lactic acid is first polymerized into an oligomer with a first molecular weight, and thereafter the oligomer is copolymerized with di-isocyanate reacting with the free hydroxyl and carboxyl groups of it to form a polyurethane with a second molecular weight higher than said first molecular weight.

10. A material for agricultural film or planting pots, said material being comprised of a lactic acid based polyurethane in which a monomeric lactic acid is first polymerized into an oligomer with a first molecular weight, and thereafter the oligomer is copolymerized with di-isocyanate reacting with the free hydroxyl and carboxyl groups of it to form a polyurethane with a second molecular weight higher than said first molecular weight.

11. A coating of fertilizer granules, said coating being comprised of a lactic acid based polyurethane in which a monomeric lactic acid is first polymerized into an oligomer with a first molecular weight, and thereafter the oligomer is copolymerized with di-isocyanate reacting with the free hydroxyl and carboxyl groups of it to form a polyurethane with a second molecular weight higher than said first molecular weight.

12. The method of claim 8 wherein the lactic acid composition includes glucose.

13. The method of claim 12 wherein the glucose-containing lactic acid composition is prepared by fermenting glucose.

14. The method of claim 8 wherein the lactic acid composition includes succinic acid.

* * * * *